US010882971B2

(12) United States Patent
Walker

(10) Patent No.: US 10,882,971 B2
(45) Date of Patent: Jan. 5, 2021

(54) ONE PART EPOXY-BASED COMPOSITION

(71) Applicant: Zephyros, Inc., Romeo, MI (US)

(72) Inventor: Jason Walker, Lenox, MI (US)

(73) Assignee: ZEPHYROS, INC., Romeo, MI (US)

( * ) Notice: Subject to any disclaimer, the term of this patent is extended or adjusted under 35 U.S.C. 154(b) by 0 days.

(21) Appl. No.: 15/547,983

(22) PCT Filed: Feb. 1, 2016

(86) PCT No.: PCT/US2016/015934
§ 371 (c)(1),
(2) Date: Aug. 1, 2017

(87) PCT Pub. No.: WO2016/126595
PCT Pub. Date: Aug. 11, 2016

(65) Prior Publication Data
US 2018/0030199 A1 Feb. 1, 2018

Related U.S. Application Data

(60) Provisional application No. 62/111,231, filed on Feb. 3, 2015, provisional application No. 62/111,349, filed on Feb. 3, 2015.

(51) Int. Cl.
C08K 3/01 (2018.01)
C08K 3/016 (2018.01)
C08G 59/40 (2006.01)
C09J 163/00 (2006.01)

(52) U.S. Cl.
CPC .............. C08K 3/01 (2018.01); C08G 59/40 (2013.01); C08K 3/016 (2018.01); C09J 163/00 (2013.01)

(58) Field of Classification Search
CPC ................................ C08K 3/016
See application file for complete search history.

(56) References Cited

U.S. PATENT DOCUMENTS

| | | | |
|---|---|---|---|
| 4,061,812 A | 12/1977 | Gilwee et al. | |
| 4,181,780 A | 1/1980 | Brenner | |
| 4,299,872 A | 11/1981 | Miguel et al. | |
| 5,187,203 A | 2/1993 | Lenox | |
| 5,650,448 A | 7/1997 | Wallace | |
| 5,719,199 A | 2/1998 | Wallace et al. | |
| 5,723,515 A | 3/1998 | Gottfried | |
| 5,942,561 A | 8/1999 | Okisake et al. | |
| 6,140,122 A | 10/2000 | Romet-Lemonne et al. | |
| 6,410,122 B1 | 6/2002 | Tono et al. | |
| 6,679,969 B1 | 1/2004 | Fournier et al. | |
| 7,284,726 B2 | 10/2007 | Fabian et al. | |
| 2002/0020827 A1 | 2/2002 | Munzenberger et al. | |
| 2002/0120024 A1 | 8/2002 | Koffler et al. | |
| 2003/0008119 A1 | 1/2003 | Tono et al. | |
| 2003/0175497 A1 | 9/2003 | Kobe et al. | |
| 2006/0254164 A1 | 11/2006 | Ueda et al. | |
| 2007/0101679 A1 | 5/2007 | Harthcock et al. | |
| 2008/0090075 A1* | 4/2008 | Kondo | B32B 7/12 428/344 |
| 2011/0024039 A1* | 2/2011 | Campbell | C08G 59/5086 156/330 |
| 2011/0034577 A1 | 2/2011 | Peng et al. | |
| 2011/0244245 A1* | 10/2011 | Elgimiabi | C08G 59/50 428/416 |
| 2012/0153242 A1 | 6/2012 | LeBonte et al. | |
| 2012/0177877 A1 | 7/2012 | Lebail et al. | |
| 2013/0149531 A1* | 6/2013 | Kosal | B32B 7/12 428/354 |

FOREIGN PATENT DOCUMENTS

| | | |
|---|---|---|
| CN | 1302828 A | 7/2001 |
| CN | 101067465 A | 11/2007 |
| DE | 29719861 U1 | 11/1997 |
| EP | 1095980 A1 | 2/2001 |
| GB | 2252076 A | 7/1992 |
| JP | 7309976 A | 11/1995 |
| JP | 0948083 A | 2/1997 |
| JP | 9208731 A | 12/1997 |
| JP | 2000001558 A | 1/2000 |
| JP | 2000218736 A | 8/2000 |
| JP | 2001106926 A | 4/2001 |

(Continued)

OTHER PUBLICATIONS

Dow D.E.R. 331 Product Information sheet (no date).*
Olin Corporation Sales Specification (Year: 2018).*
International Search Report for application No. PCT/US2015/063352. dated Mar. 26, 2016.
European Office Action dated Mar. 24, 2015; Application No. 10740143.2.
Chinese Second Office Action dated Dec. 13, 2013; Application No. 201080027999.9.
Chinese Office Action dated Mar. 1, 2013; Application No. 201080027999.9.
Chinese Rejection Decision dated Jul. 18, 2014; Application No. 201080027999.9.
"The Epoxy Book", Published by System Three Resins, Inc. Seattle, 2000.

(Continued)

Primary Examiner — Peter F Godenschwager
(74) Attorney, Agent, or Firm — The Dobrusin Law Firm, P.C.

(57) ABSTRACT

The present teachings relate generally to a one part room temperature curable composition. e.g., a one-part epoxy-based adhesive precursor composition. The composition may include an epoxy resin, and a filler. The composition may include a flame retardant sufficient so that when the adhesive precursor composition is cored, it meets applicable requirements for flame retardancy of 14 C.F.R. § 25.853 for aircraft inferior cabins. An amount of a curing agent may be included. The selection of the epoxy resin, curing agent, or both, may afford curing with or without the need for an application of heat. The epoxy resin, the filler, any flame retardant and the curing agent are admixed to define a substantially homogenous admixture, thereby defining a mass of adhesive precursor.

16 Claims, No Drawings

(56) References Cited

FOREIGN PATENT DOCUMENTS

| | | |
|---|---|---|
| JP | 2004174865 A | 6/2004 |
| JP | 2007/204621 A | 8/2007 |
| JP | 2007254563 A | 10/2007 |
| WO | 03/048242 A1 | 6/2003 |
| WO | 2007/050536 A1 | 5/2007 |

OTHER PUBLICATIONS

Born et al., Structural Bonding in Automotive Applications, Apr. 2004.

Product Literature for Structural Adhesives and Structural Specialty Products, Oct. 14, 2005.

PCT Search Report dated Sep. 14, 2010 (Application No. PCT/EP2010/003778).

Database WPI Week 199807, Thomson Scientific, London, GB; AN 1998-066083, XP002600574 & JP 9 208731 A (Sekisui Chem Ind Co. Ltd) Aug. 12, 1997, *abstract.

Database WPI Week 200776, Thomson Scientific, London, GB; AN 2007-809222, XP002600575 & JP 2007 204621 A (Sumitomo Chem Co. Ltd) Aug. 16, 2007, *abstract.

Database WPI Week 199605, Thomson Scientific, London, GB; AN 1996-045451, XP002600576 & JP 7 309976 A (Hokushin Kogyo KK) Nov. 28, 1995, *abstract.

Database WPI Week 200012, Thomson Scientific, London, GB; AN 2000-130569, XP002600577 & JP 2000 001558 A (Mitsui Chem Inc.) Jan. 7, 2000, *abstract.

PCT Search Report dated Nov. 24, 2010 (Application No. PCT/EP2010/003777).

European Office Action dated Nov. 23, 2012; Application No. EP10757386.7.

Great Britain Search Report dated Sep. 9, 2010; Application No. GB0921695.3.

\* cited by examiner

ONE PART EPOXY-BASED COMPOSITION

FIELD

The present teachings relate to epoxy-based formulations, and more particularly to a one-part epoxy-based formulation that can be cured with or without any heat activation.

BACKGROUND

There is an ongoing need in many industries (e.g., transportation, such as in marine craft, rail cars, automotive vehicles, aircraft, or otherwise; building construction) for improved compositions that exhibit flame retardancy, ease of use, relatively good performance for their intended purposes, and/or reduction in the number of steps needed for processing the compositions for their intended use. Examples of such applications include adhesive or other compositions for use in potting, edge close-out, local reinforcement, and/or core splices of one or more bodies, such as a body having hollow sections, cavities, and/or void-containing structures. One such body is a honeycomb structure panel of a type commonly employed in aerospace applications.

Though two-component formulations often provide good performance, they tend to suffer from a relatively short working life, i.e., as measured per ASTM D1338-99 (2011). As a result, the amount of time that is available upon subjecting components of a formulation to curing conditions is relatively short and limits the ability to appropriately shape and locate it in the desired location. That is, because many two-component formulations are curable at room temperature, from the time the components are mixed, there will be a build-up of curing, which will increase the viscosity and attendant rigidity of the resulting material. The build-up of viscosity and attendant rigidity hinders hand application or application via a nozzle (such as by a pump or gun).

Examples of commercially available materials finding similar application include L-9001 and L-9003 (both being one component heat curable epoxy based compositions), available from L&L Products, Inc. (Romeo, Mich., USA).

While many existing compositions meet some of the above needs, there continues to be a need for improved materials that simplify manufacture and/or use of the compositions, which help reduce the amount of such compositions that are needed, or that meet some other need. There is especially a need for additional materials that offer an appropriate balance of viscosity (e.g., to allow for filling of cavities, or other voids, or to otherwise permit ready ability for handling during its working life), and good resulting strength and/or modulus characteristics (e.g., in compression) upon cure.

SUMMARY

The present teachings relate generally to a one part room temperature curable composition. The composition may be a one-part adhesive precursor composition. For example, the composition may be a one-part epoxy-based adhesive precursor composition. The composition may include an epoxy resin component.

The composition may include a filler (e.g., hollow microspheres, e.g., hollow glass (such as soda lime borosilicate glass) microspheres). The filler may have a density (i.e., a true particle density), per ASTM C128-12 of about 2 to about 5 grams/cubic centimeter (g/cm$^3$), or even about 2.8 to about 4.5 g/cm$^3$). The filler may have an average particle diameter in the range of about 30 to about 60 microns ($\mu$), or even about 40 to 50$\mu$ (e.g., about 45$\mu$), as measured by ASTM D1214-10. The filler may be present, by weight, in a proportion of filler relative to the total epoxy resin component of about 1:5 to about 2:1, e.g., about 1:3 to about 1:1, or even about 1:1.5. The density of the filler may be less than 1 g/cc. The density of the filler may be at least about 0.05 g/ml. The density of the filler may be less than about 0.80 g/ml.

The composition may also include an amount of a flame retardant (which may be a halogen-free flame retardant) sufficient so that when the adhesive precursor composition is cured to its substantially fully cured state, the resulting fully cured adhesive composition exhibits sufficient flame retardancy to meet one or more of the requirements for demonstrating flame retardancy (e.g., to meet vertical burn and/or smoke density requirements (or some other requirement) as set forth in 14 C.F.R. § 25.853 and 14 C.F.R. § 25.856 (the United States Code of Federal Regulations for compartment interiors, including but not limited to 14 C.F.R. § 25.853(a)), and the referenced Appendix F and procedures referenced therein, all of which are incorporated by reference herein for all purposes).

An amount of a curing agent may be included in the composition in an amount sufficient to cause curing of the adhesive precursor composition to a substantially fully cured state, when the adhesive precursor composition is subjected to a curing condition over a period not to exceed about 12 hours (e.g., not to exceed about 8 hours or even not to exceed about 6 hours) to become fully cured, while retaining a working life per ASTM D1338-99 (2011) of at least 1 hour (e.g., at least about 2 hours, 3 hours or 4 hours). The epoxy resin, the filler, any flame retardant and the curing agent are admixed to define a substantially homogenous admixture, thereby defining a mass of adhesive precursor. By the selection of the epoxy resin and curing agent it is possible to have a room temperature cure, if so desired. Additionally, it is possible to avoid the need for a two-part admixture and the potential inconveniences associated therewith.

The teachings herein further envision a one-part epoxy-based adhesive precursor composition, comprising at least about 3 parts by weight of the adhesive precursor composition of an epoxy resin component and at least about 10 parts by weight of a filler. The composition may further include an amount of a flame retardant (e.g., a halogen-free flame retardant) sufficient so that when the adhesive precursor composition is cured to a degree of cure of at least about 50%, the resulting cured adhesive composition exhibits sufficient flame retardancy to meet the requirements of one or more of FAR 25.853 or FAR 25.856. A curing agent may also be included in an amount sufficient to cause curing of the adhesive precursor composition to a degree of cure of at least about 50%, when the adhesive precursor composition is subjected to a curing condition over a period not to exceed about 12 hours, while retaining a working life (as measured by per ASTM D1338-99 (2011) of at least 1 hour. The epoxy resin, filler, the flame retardant and the curing agent are admixed to define a substantially homogenous admixture, thereby defining a mass of adhesive precursor.

The teachings herein also provide for a method of panel edge closure, potting, and reinforcement comprising one or more of the following steps: providing a one-part low temperature cure epoxy-based material, extruding the epoxy-based material, maintaining the extruded epoxy-based material at a temperature of less than about 0° C., thawing the epoxy-based material, applying the epoxy-based material to one or more lightweight panel structures, and curing the epoxy-based material by exposure to room temperature conditions. The method may require no mixing prior to the applying step. The mass of adhesive precursor may also be transported, stored, or both, under conditions that inhibit curing of the mass of adhesive precursor. The mass of adhesive precursor may be transported, stored, or both under a refrigerated condition (e.g., to a temperature below about 0° C.), in the absence of exposure to a source of electromagnetic energy (e.g., ultraviolet radiation, infrared radiation or otherwise), or some other curing activation source.

The epoxy resin component of the composition of the present teachings may include a combination (e.g., a mixture of two or more epoxy resins) of epoxy materials. The mixture may include a plurality of epoxy resins that differ in viscosity relative to each other by at least 20%, 30%, 40% or more. For example there may be a mixture of a first epoxy resin and a second epoxy resin. There may be a mixture of a first epoxy that is generally liquid at room temperature and a second epoxy resin that is generally solid at room temperature. The first epoxy resin and the second epoxy resin may be present, by weight, in a relative proportion of about 8:1 to about 1:2 (e.g., about 6:1 to about 1:1, or even about 3:1).

DETAILED DESCRIPTION

The explanations and illustrations presented herein are intended to acquaint others skilled in the art with the invention, its principles, and its practical application. Accordingly, the specific embodiments of the present disclosure as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present application claims the benefit of the priority date of U.S. Provisional Application Ser. No. 62/111,231, filed Feb. 3, 2015, and 62/111,349, filed Feb. 3, 2015 the contents of these applications being hereby incorporated by reference for all purposes.

As used herein, substantially entirely cured refers to a state of curing when, with the passage of time, a material herein exhibits substantially no variation in its mechanical properties. One suitable approach for use herein is to correlate the state of curing with hardness of the curing material over time. At such time when there is substantially no variation in the measured hardness of the curing material (e.g., repeated periodic testing over at least five one hour intervals shows a fluctuation within about +/−3 points Shore D, as measured by ASTM D-2240-05), then the material can be deemed substantially entirely cured.

The present teachings relate generally to a one part room temperature curable composition. The composition may be a one-part epoxy-based adhesive precursor composition. The composition may include an epoxy resin component. The composition may include a filler having a relatively high surface area to weight ratio; that is, taking into account the density of the filler and its particle sizes. The composition may also include an amount of a flame retardant (e.g., a halogen-free flame retardant, such as a phosphorus containing flame retardant) sufficient so that when the adhesive precursor composition is cured it will meet the requirements for flame retardancy as set forth in 14 C.F.R. § 25.853 and 14 C.F.R. § 25.856 (the United States Code of Federal Regulations for aerospace compartment interiors, including but not limited to 14 C.F.R. § 25.853(a), and the referenced Appendix F and procedures referenced therein (e.g., 60 second vertical burn test per 14 C.F.R. § 25.853 App. F Part 1(a)(i), smoke density test per 14 C.F.R. § 25.853 App. F Part V (b)), all of which are incorporated by reference for all purposes). An amount of a curing agent may be included in the composition. The selection of the epoxy resin component, the curing agent component or both, may be such that it affords curing with or without the need for an application of heat. The epoxy resin, the filler, any flame retardant and the curing agent are admixed to define a substantially homogenous admixture, thereby defining a mass of adhesive precursor. By the selection of the epoxy resin and curing agent it is possible to have a room temperature cure, if so desired. Curing may be over a period of about one to about eight hours, e.g., about 2 to about 6 hours, or even about 4 hours. Additionally, it is possible to avoid the need for a two-part admixture and the potential inconveniences associated therewith.

Turning now to a more complete description of the ingredients of the composition. The epoxy resin component may include a combination of two or more epoxy resins. The two or more epoxy resins may vary relative to each other in one or more respects (e.g., viscosity, epoxy equivalent weight, functionality or otherwise). The epoxy resin component may include a first epoxy resin and a second epoxy resin. The epoxy resin combination may be such that the composition of the present teachings exhibits, when cured, one or any combination of a relatively high compressive strength, a relatively high compression modulus, a relatively high tube shear strength, all while exhibiting acceptable flame retardancy and a relatively low density.

The first epoxy resin may be an epoxy novolac resin, e.g., an unmodified phenol novolac resin. The first epoxy resin may have a functionality of about 2 to about 4 (e.g., about 2.3 to about 3.2, or even about 2.5 to about 3.0). The first epoxy resin may have an epoxy equivalent weight per ASTM D-1652-11e1 of about 150 to about 200 grams/equivalent (g/eq), e.g., about 160 to about 180 g/eq. The first epoxy resin may have a viscosity (at 25° C., per ASTM D-44514e2) in the range of about 12,000 to about 35,000 centipoise (cps), e.g., about 15,000 to about 32,000 cps, or even about 18,000 to about 28,000 cps). An example of a commercially available first epoxy resin is Epalloy®8250, available from CVC Thermoset Specialties.

The second epoxy resin may be a reaction product (e.g., a solid reaction product) of a liquid epoxy resin and bisphenol-A, e.g., a reaction product of epichlorohydrin and bisphenol A. The second epoxy resin may have a viscosity at 25☐C (cSt) per ASTM D-445-14e2 of about 140 to about 180, e.g., about 165 to 250 (40 weight percent diethylene glycol monobutyl ether). The second epoxy resin may have an epoxy equivalent weight (g/eq) per ASTM D-1652-11e1 of about 400 to about 700, e.g., about 500 to about 560. The second epoxy resin may be commercially available, such as D.E.R.™ 661, available from The Dow Chemical Company.

The first epoxy resin and the second epoxy resin may be present, by weight, in a relative proportion of about 8:1 to about 1:2 (e.g., about 6:1 to about 1:1, or even about 3:1 first epoxy component to second epoxy component).

The filler may be a relatively high volume to weight filler. The filler may comprise a single type of filler. The filler may be a combination of a plurality of fillers. The filler may have a density (i.e., a true particle density), per ASTM 0128-12 of about 0.01 to about 5 grams/milliliter (g/ml), about 0.05 to about 1 g/ml, or even about 0.12 to about 0.63 g/ml). The filler may be an organic filler, an inorganic filler, or a combination of both. The filler may be a hollow filler. The filler may include hollow particles which may be glass microspheres. The filler may consist essentially of glass microspheres. The filler may have an elongated geometry. The filler may have a spherical geometry. The filler may be in a particulated form. The filler may be in the form of a rod, a bead, a whisker, a platelet or any combination thereof. The filler may include silicon. The filler may include amorphous silica. The filler may include soda lime borosilicate glass. The filler may include fumed silica. One illustrative filler includes a plurality of glass beads. For example, the glass beads may be glass microspheres. The glass beads may be hollow glass microspheres. An example of a commercially available filler is a glass bubble product offered by 3M under the designation K37. The filler may be present, by weight, in a proportion of filler relative to the total epoxy resin component of about 1:5 to about 2:1, e.g., about 1:3 to about 1:1, or even about 1:1.5. The proportion of the weight of the epoxies, relative to the filler is about 5:1 to about 1:2. The filler may include or may consist essentially of hollow glass microspheres characterized by a particle size of from about 20 microns to about 85 microns, whereby at least 50% of the particles have a particle size of at least 70 microns.

The halogen-free flame retardant may include a compound in which phosphorus is present. The flame retardant may include a polyphosphate. For example, it may include an ammonium polyphosphate. An example of a commercially available flame retardant useful herein is JLS-PNP1C or JLS APP, available from JLS.

The teachings herein may employ an amount of a flame retardant (e.g., a halogen-free flame retardant) sufficient so that when the adhesive precursor composition is fully cured, the resulting cured adhesive composition exhibits sufficient flame retardancy to meet the requirements of one or more of the 60 second vertical burn test per 14 C.F.R. § 25.853 App. F Part 1(a)(i), the smoke density test per 14 C.F.R. § 25.853 App. F Part V (b)), or the smoke toxicity test per AITM 3.0005 (as required by Airbus).

By way of example, the flame retardant may be present in an amount of about 5 to about 70, e.g., about 15 to about 55, about 25 to about 40, or even about 34 percent by weight of the overall weight of the composition of the teachings herein. The proportionate amount, by weight, of the flame retardant relative to the epoxy resin may be about 2:1 to about 1:2, e.g., about 1:1.

The curing agent may be a suitable epoxy curing agent. It may comprise one or more curing agents. It may include a curing agent accelerator. The curing agent may have one or more amine functionalities. The curing agent may include or consist of a polyamide. The curing agent may include or consist of an aliphatic amine, e.g., it may include or consist of a polyfunctional aliphatic amine. The curing agent may be a cycloaliphatic amine. The curing agent may include one or more imidazole functional groups. The curing agent may be in a liquid form. The curing agent may have a Brookfield viscosity (per ASTM 3236-88 (2014)) in the range of about 200 to about 800 MPa-s, e.g., about 300 to about 600 MPa-s. The curing agent may have an N—H equivalent weight of about 50 to 250, e.g., about 70 to about 125, or even about 100. The curing agent may have an amine value per ASTM 2073-92 (1998) e1 (now withdrawn) (mg KOH/g) of about 300 to about 500, e.g., about 370 to about 410.

Examples of commercially available curing agents include, without limitation, Ancamide 350A, available commercially from Air Products, or Versamid 140, available commercially from Henkel.

An amount of a curing agent sufficient to cause curing of the adhesive precursor composition to a fully cured state, when the adhesive precursor composition is subjected to a curing condition over a period not to exceed about 6 hours, while retaining a working life of at least 2 hours (e.g., about 3 hours or 4 hours). By way of illustration, the curing agent may be present in a proportionate amount, by weight, to the total amount of epoxy resin of about 1:1 to about 1:10, e.g., about 1:2.5.

For achieving the cure rates as taught herein, it is possible that the dimensions of a mass of the adhesive composition of the teachings herein may have a thickness that is below about 100 mm, below about 50 mm, below about 30 mm, below about 20 mm, or even below about 10 mm (e.g., thickness may be about 1 mm, about 2 mm, about 3 mm, about 4 mm, about 5 mm, about 6 mm, about 7 mm, about 8 mm, about 9 mm or about 10 mm). Width and/or length may be in the range of about 3 meters, about 2 meters, about 1 meter, about 0.5 meter, about 0.3 meter, or smaller.

Other additives may be included in the composition of the present teachings, including one or more of a UV stabilizer, an antioxidant, a processing aid, a blowing agent, a plasticizer, a curing accelerator, colorant, impact modifier, a flexibilizer, a thickener, or a reinforcement (e.g., a fibrous reinforcement). The compositions of the teachings may be provided with a release layer, a handling film, or both.

The composition of the present teachings may be made by admixing the ingredients to form one or more admixtures. For example, a masterbatch may be formed to include a mixture of one or more epoxy resins and filler. The initial mixing may omit any curing agent. The initial mixing may be at a temperature sufficiently high to render the epoxy resin fluidic (e.g., a temperature of about 70 to about 90 □C). Thereafter, upon mixing of any epoxy resin with curing agent, throughout the mixing and/or the subsequent handling of resulting admixture the temperature of the admixture may be maintained at a reduced temperature, e.g., below about 60° C., below about 45° C., or even below about 23□C.

Mixing is performed under conditions that impart relatively low shear forces to the admixed ingredients, to thereby help to avoid heat generation that would induce premature curing. It is possible that a planetary mixer may be employed for any of the mixing steps. Mixing proceeds until all ingredients appear to be substantially homogeneously mixed. Mixing may proceed in a plurality of relatively brief intervals (e.g., about 5 to about 30 seconds, such as about 10 to about 15 seconds), or at some other interval sufficient to help avoid heating. For instance, a pigment may be employed so that a consistent and uniform color is observed upon mixing. Upon completion of mixing, a batch may be poured out and pressed between release paper, or otherwise handled to help reduce the temperature of the mixture and avoid premature curing.

The mass of adhesive precursor may be in a predetermined shaped form and may have a predetermined size. Accordingly, resulting compositions may be processed to define a tape, a paste, a sheet, an elongated member having a continuous or discontinuous cross-sectional profile, a bead, or otherwise. The composition may be applied within the interstices of a honeycomb form (e.g., a non-metallic honeycomb form, such as a core of a sandwich laminate). The composition may be applied along one or more side edges of a panel structure, which may be a honeycomb form. The composition may be capable of being extruded or otherwise shaped into a specific constant geometry profile or some other geometry.

The compositions may be maintained in a refrigerated condition until the time of their intended use. For example, the teachings herein envision maintaining the compositions herein at a temperature of less than about 18° C., 14° C., 10° C., 5° C., or even 0° C. At the time of the intended use, the teachings envision allowing the compositions herein to be exposed to an activation condition (e.g., heat, moisture, radiation, or otherwise). For example, the teachings may employ a step of allowing the compositions to warm to a predetermined temperature (e.g., about 23° C. or higher) for a sufficient amount of time so that substantially homogeneous curing of the composition occurs substantially throughout the composition.

The teachings herein find application in the transportation industry (e.g., for use in automotive vehicles, aircraft, railcars, or otherwise, such as in panel structures), in the construction industry (e.g., as wall panels), or elsewhere.

Articles made using the compositions of the teachings herein are also envisioned within the scope of the teachings. Examples of such articles include, without limitation, potted structures, panels with an edge close-out, locally reinforced structures (such as a locally reinforced panel), a core-spliced body (e.g., a spliced honeycomb structural panel). The articles may be panels (e.g., ceiling and/or side walls), partitions, cargo and/or baggage compartments, or the like. Any of the foregoing may include a honeycomb structure that defines a plurality of voids into which the composition of the present teaching is inserted.

The compositions of the present teachings desirably may exhibit one or any combination of the following characteristics. The composition of the present teachings may exhibit an uncured density per ASTM D1895-96(2010)e1 of about 1.0 to about 1.4 g/cm$^3$, e.g., about 1.2 g/cm$^3$. The composition of the present teachings may exhibit a compressive strength at 23□C per ASTM D695-10, in its cured state, of about 13 MPa to about 30 MPa, e.g., at least about 16.5 MPa. The composition of the present teachings may exhibit a compressive modulus at 23 □C per ASTM D695-10, in its cured state, of about 0.3 to about 5.0 GPa, e.g., at least about 0.8. The composition of the present teachings may exhibit a tube shear strength at 23□C per DIN EN 2667-2, in its cured state, of about 10 to about 30 Mpa, e.g., at least about 15 Mpa.

The compositions of the present teachings, in a cured state (e.g., a state of at least 75% cured) also pass one or any combination of the 60 second Vertical Burn test per 14 C.F.R. § 25.853 App. F Part 1(a)(i); Smoke Density per 14 C.F.R. § 25.853 App. F Part V (b), or Smoke Toxicity per AITM 3.0005.

The adhesive precursor compositions of the present teachings exhibit storage stability under refrigerated conditions (e.g., at a temperature in the range of about −15 to about 15□C) in a sealed container (e.g., sealed from one or more of light, oxygen, moisture, heat) for a period of at least about one month, 3 months, 6 months or at least about 1 year (e.g., a storage stability of about 1 month to about 2 years). During such period of storage stability the time of the working life, the time to cure to a fully cured state, or both, of the adhesive precursor compositions will be within 25% of the working life and/or time to cure to a fully cured state, at the time the composition is prepared.

The ingredients of the following Table 1 are admixed using low shear mixing to avoid producing too much heat. As applicable generally to the teachings herein, the resins, flame retardant and filler are mixed first (e.g., at a temperature of about 70 to about 90° C. and a rate of about 1000 revolutions per minute of the mixing blade, and in intervals of about 30 seconds of mixing). The curing agent is later added, preferably after the temperature of the mixture has dropped below about 50° C. An optional pigment may be added (e.g., in an amount less than about 5 parts by weight of the overall composition). Then mixing occurs at 1000 rpm for 10 to 15 second intervals until homogeneous ingredient distribution is observed. Once the batch appears to be thoroughly mixed it is poured out and pressed between release paper to accelerate cooling.

TABLE 1

| Ingredient | Parts by Weight |
| --- | --- |
| Second Epoxy Resin: DER 661 | 8.01 |
| First Epoxy Resin: Epalloy 8250 | 24.02 |
| Flame Retardant: JLS-PNP1C or JLS APP | 34.70 |
| Filler: K37 Glass Bubbles | 20.02 |
| Curing Agent: Ancamide 350A | 13.15 |
| Total | 100.00 |

The composition of Table 1 is expected to provide performance results approximating those (e.g., within about 20%, or even about 10% of the recited values) of the following Table 2.

The batch of the composition of Table 1 is sealed in a fluid tight bag and stored at a temperature of about −6° C. until testing. At time of testing the composition is allowed to come to room temperature, and is cured at room temperature. Samples are tested after a cure period of 24 hours. Samples for testing are made from material that has been stored for a period of one day from mixing, one week from mixing, one month from mixing, three months from mixing, and one year from mixing, the material being stored in a sealed fluid tight bag and refrigerated as previously described.

The batch of the composition of Table 1 is sealed in a fluid tight bag and stored at a temperature of about −6° C. until testing. At time of testing the composition is allowed to come to room temperature, and is cured at room temperature (though uncured density is measured prior to cure). Samples are tested after a cure period of 24 hours. Samples for testing are made from material that has been stored for a period of one day from mixing, one week from mixing, one month from mixing, three months from mixing, and one year from mixing, the material being stored in a sealed fluid tight bag and refrigerated as previously described. The composition of Table 1 is expected to provide performance results approximating those (e.g., within about 20%, or even about 10% of the recited values) of the following Table 2.

TABLE 2

| Property | Sample Value |
| --- | --- |
| Uncured Density per ASTM D1895-96(2010)e1 | 1.2 g/cm3 |
| Compressive Strength at 23° C. per ASTMD695-10 | 13 MPa |
| Compressive Modulus at 23° C. per ASTM D695-10 | 0.6 GPa |

TABLE 2-continued

| Property | Sample Value |
| --- | --- |
| Tube Shear Strength at 23° C. per DIN EN 2667-2 | 12 MPa |
| 60 second Vertical Burn per 14 C.F.R. §25.853 App. F Part 1(a)(i) | Passes |
| Smoke Density per 14 C.F.R. §25.853 App. F Part V (b) | Passes |
| Smoke Toxicity per AITM 3.0005 | Passes |

It is possible that a single epoxy resin, a single flame retardant, a single filler and/or a single curing agent may be employed. It is also, possible that there may be a combination of two or more flame retardants may be employed, that two or more fillers may be employed, that two or more curing agents may be employed. In the event that two or more flame retardants, fillers, and or curing agents are employed, it is possible that the total amount of any such additional (beyond a single one) flame retardant, filler, and/or curing agent may be present in an amount by weight that it less than about 20 percent, or even about 10 percent of the total of the respective flame retardant, filler, or curing agent. Thus, for example, a flame retardant may include a 4:1 (or 9:1) admixture of two curing agents; a filler may include a 4:1 (or 9:1) admixture of two fillers; or the curing agent may include a 4:1 (or 9:1) admixture of two curing agents. Other proportions are also possible.

As seen from the above, compositions of the teachings enable excellent working life. For example, it is possible that a working life for a mass of the composition of the teachings will be at least about 2 hours, 3, hours, 4 hours or longer.

It is possible that upon conclusion of the working life, the mass of the composition of the teachings will cure to substantially fully cured state over a period of less than about 4 hours, less than about 3 hours, less than about 2 hours, or even less than about one hour.

Masses of the compositions of the teachings, prior to curing, may exhibit excellent shelf life and storage stability. For example, when stored at a temperature below about 0° C. (e.g., about −5° C. to about 0° C.) for a period of at least about 3 months, 6 months, 9 months, or even 12 months, the working life will remain substantially unchanged (e.g., with about 15% of the working life of the uncured composition as initially prepared) relative to the working life of the uncured composition as initially prepared. The mass of adhesive precursor preferably exhibits a shelf-life period of at least about 3 months, during which shelf-life period the mass of adhesive precursor exhibits a degree of cure of below about 5%.

Both during and after curing, the compositions of the present teachings may exhibit no shrinkage.

The following comments pertain generally to all teachings. Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting composition" also contemplates a teaching of ranges of same recited amount of "x" in percent by weight of the resulting composition.

Unless otherwise stated, any test method standard referenced herein is for the version existing as of the earliest filing date in which the standard is recited.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consist of the elements, ingredients, components or steps. Plural elements, ingredients, components or steps can be provided by a single integrated element, ingredient, component or step. Alternatively, a single integrated element, Ingredient, component or step might be divided into separate plural elements, ingredients, components or steps. The disclosure of "a" or "one" to describe an element, ingredient, component or step is not intended to foreclose additional elements, ingredients, components or steps. Moreover, unless expressly set forth, the recitation of "first", "second", or the like does not preclude additional ingredients, steps, or other elements. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups. It is understood that the above description is intended to be illustrative and not restrictive.

Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A one-part epoxy-based adhesive precursor composition, comprising:
   a. at least about 3 parts by weight of an epoxy resin component, which includes a first epoxy and a second epoxy;
   b. at least about 10 parts by weight of a filler;
   c. an amount of a flame retardant sufficient so that when the one-part epoxy-based adhesive precursor composition is cured to a degree of cure of at least about 50%, a resulting cured adhesive composition exhibits sufficient flame retardancy to meet the requirements of one or more of FAR 25.853 or FAR 25.856; and
   d. an amount of a curing agent sufficient to cause, at room temperature, curing of the one-part epoxy- based adhesive precursor composition to a degree of cure of at least about 50%, when the one-part epoxy-based adhesive precursor composition is subjected to a curing condition over a period not to exceed about 8 hours, while retaining a working life, as measured per ASTM D1338-99(2011), of at least 1 hour; wherein the epoxy resin component, the filler, the flame retardant, and the curing agent are admixed to define a substantially homogenous admixture, thereby defining a mass of the one-part epoxy-based adhesive precursor composition; and
   wherein the flame retardant is present in the one-part epoxy-based adhesive precursor composition in an amount of about 15% by weight to about 55% by weight.

2. The one-part epoxy-based adhesive precursor composition of claim 1, wherein the mass of the one-part epoxy-based adhesive precursor composition has a predetermined size or is in a predetermined shaped form.

3. The one-part epoxy-based adhesive precursor composition of claim 1, wherein the first epoxy: is a liquid; has an epoxy equivalent weight, per ASTM D-1652-11e1 of about 150 to about 200 grams/equivalent; or both.

4. The one-part epoxy-based adhesive precursor composition of claim 3, wherein the first epoxy is an epoxy novolac resin.

5. The one-part epoxy-based adhesive precursor composition claim 1, wherein the second epoxy: is a solid; has an epoxy equivalent weight, per ASTM D-1652-11e1, of about 400 to about 700 grams/equivalent; or both.

6. The one-part epoxy-based adhesive precursor composition of claim 5, wherein the second epoxy is a reaction product of a liquid epoxy resin and bisphenol-A.

7. The one-part epoxy-based adhesive precursor composition of claim 1, wherein the filler consists essentially of glass microspheres characterized by a particle size of from about 20 microns to about 85 microns, whereby the particle size of at least 50% of the glass microspheres is at least 70 microns.

8. The one-part epoxy-based adhesive precursor composition of claim 1, wherein the flame retardant is characterized in that it causes the one-part epoxy-based adhesive precursor composition to meet one or more of a 60 second vertical burn test per 14 C.F.R. § 25.853 App. F Part 1(a)(i), a smoke density test per 14 C.F.R. § 25.853 App. F Part V (b), or a smoke toxicity test per AITM 3.0005.

9. The one-part epoxy-based adhesive precursor composition of claim 1, wherein the flame retardant is a halogen-free flame retardant.

10. The one-part epoxy-based adhesive precursor composition of claim 1, wherein the curing agent is a cycloaliphatic amine.

11. The one-part epoxy-based adhesive precursor composition of claim 1, wherein the epoxy resin component and the filler are present, by weight, in a relative proportion of about 5:1 to about 1:2.

12. The one-part epoxy-based adhesive precursor composition of claim 1, wherein upon achieving a degree of cure of at least about 75%, the resulting cured adhesive composition exhibits sufficient flame retardancy to meet the requirements of one or more of FAR 25.853 and FAR 25.856.

13. The one-part epoxy-based adhesive precursor composition of claim 1, wherein the first epoxy, which is a liquid epoxy, and the second epoxy, which is a solid epoxy, are present, by weight, in a relative proportion of about 3:1.

14. The one-part epoxy-based adhesive precursor composition of claim 13, wherein the mass of the one-part epoxy-based adhesive precursor composition exhibits a shelf-life period of at least about 3 months, during which shelf-life period the mass of the one-part epoxy-based adhesive precursor composition exhibits a degree of cure of below about 5%.

15. The one-part epoxy-based adhesive precursor composition of claim 1, wherein the curing agent and the epoxy resin component are present, by weight, in a relative proportion of about 1:1 to about 1:10.

16. The one-part epoxy-based adhesive precursor composition of claim 1, wherein the curing agent is present in an amount of about 13% by weight of the one-part epoxy-based adhesive precursor composition.

* * * * *